US008121086B2

(12) United States Patent
Jung et al.

(10) Patent No.: US 8,121,086 B2
(45) Date of Patent: Feb. 21, 2012

(54) WIRELESS NETWORKING DEVICE AND COMMUNICATION METHOD USING THE SAME

(75) Inventors: Hye-young Jung, Seoul (KR); Ji-young Kong, Seoul (KR); Hyeong-seok Kim, Seongnam-si (KR); Jin-hyun Sin, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 867 days.

(21) Appl. No.: 11/249,472

(22) Filed: Oct. 14, 2005

(65) Prior Publication Data

US 2006/0165037 A1    Jul. 27, 2006

(30) Foreign Application Priority Data

Oct. 16, 2004   (KR) .................. 10-2004-0082922

(51) Int. Cl.
    *H04W 4/00* (2009.01)
(52) U.S. Cl. ................... 370/331; 455/436; 455/437
(58) Field of Classification Search .............. 370/331;
                                          455/436–444
    See application file for complete search history.

(56) References Cited

U.S. PATENT DOCUMENTS

| | | | | |
|---|---|---|---|---|
| 6,041,235 A * | 3/2000 | Aalto | ............ | 455/437 |
| 6,256,300 B1 * | 7/2001 | Ahmed et al. | ............ | 370/331 |
| 6,625,135 B1 * | 9/2003 | Johnson et al. | ............ | 370/332 |
| 2002/0012320 A1 | 1/2002 | Ogier et al. | | |
| 2002/0186679 A1 * | 12/2002 | Nakatsugawa et al. | ....... | 370/349 |
| 2004/0057440 A1 | 3/2004 | Thubert et al. | | |
| 2004/0092264 A1 * | 5/2004 | Koodli et al. | ................ | 455/436 |
| 2004/0103204 A1 | 5/2004 | Yegin | | |
| 2004/0111483 A1 * | 6/2004 | Watanabe | ............... | 709/207 |
| 2004/0203787 A1 * | 10/2004 | Naghian | ............... | 455/437 |
| 2004/0246906 A1 * | 12/2004 | Hardy | ............... | 370/252 |
| 2005/0105489 A1 * | 5/2005 | Jee et al. | ............... | 370/331 |
| 2007/0165559 A1 * | 7/2007 | Seguchi et al. | ............... | 370/328 |

FOREIGN PATENT DOCUMENTS

| | | |
|---|---|---|
| EP | 1 111 874 A1 | 6/2001 |
| JP | 2004186983 A | 7/2004 |
| KR | 2002-0082471 A | 10/2002 |
| KR | 10-2004-0045188 A | 6/2004 |
| WO | WO 01/28185 A1 | 4/2001 |

OTHER PUBLICATIONS

Ghassemian M et al., "Analyses of addressing and qos approaches for ad hoc connectivity with the internet", Personal, Indoor and Mobile Radio Communications, 2003, PIMRC 2003. 14th IEEE Proceedings on Sep. 7-10, 2003, Piscataway, NJ, USA, IEEE, vol. 1, Sep. 7, 2003, pp. 492-496, XP010681643.

(Continued)

*Primary Examiner* — Steven Lim
(74) *Attorney, Agent, or Firm* — Sughrue Mion, PLLC

(57) ABSTRACT

A wireless networking device and a communication method using the same. The wireless networking device includes an address generator to generate an address to be used in a predetermined wireless network, a router information setter to set router information of the wireless network, and a controller to control operation of the address generator and the router information setter according to the router information and perform hand-off to a wireless network that corresponds to the router information.

11 Claims, 15 Drawing Sheets

OTHER PUBLICATIONS

Nakagawa, T., et al., "Handover and Routing in Wireless Multi-hop Access Networks," The Transactions of the Institute of Electronics, Information and Communication Engineers, Dec. 1, 2002, p. 2147-2154, vol. J85-B, No. 12, The Communications Society, The Institute of Electronics, Information and Communication Engineers.

Wakikawa, R., et al., "Global connectivity for IPv6 Mobile Ad Hoc Networks," Global Connectivity for IPv6 Manets, Oct. 23, 2003, p. 1-32, The Internet Society.

Kanbe, K., et al., "The wide-area wireless internet by using Ad-Hoc networks and wireless LANs," Feb. 28, 2003, p. 5-10, vol. 2003, No. 18, Copyright Clearance Center, Inc., Danvers, MA.

* cited by examiner

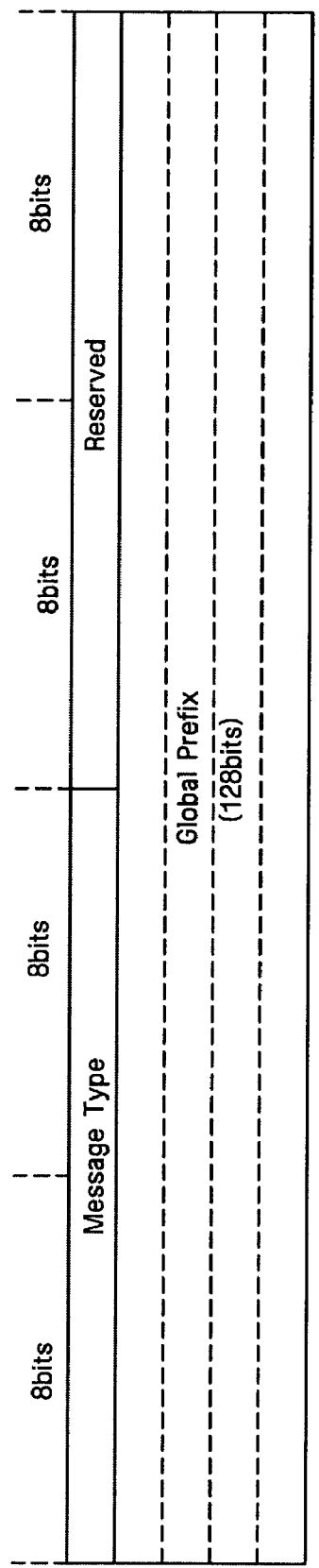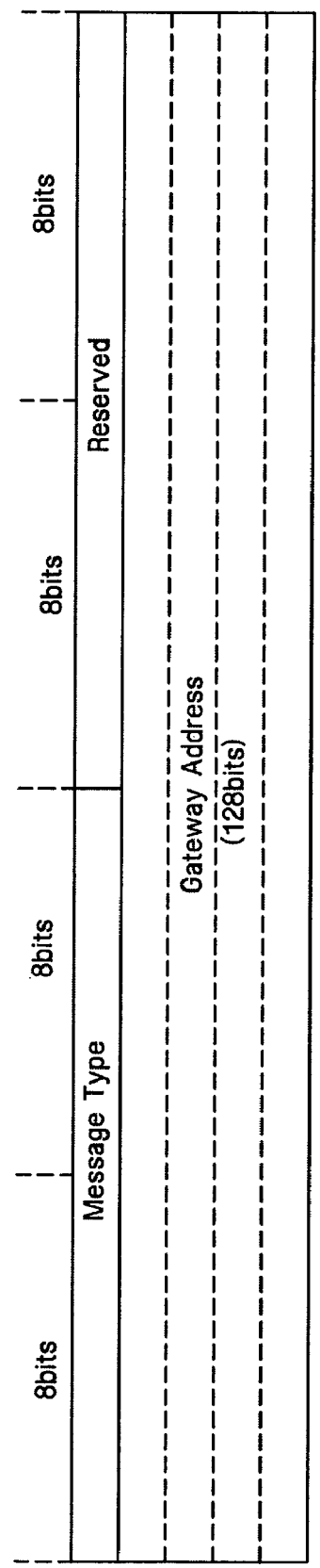

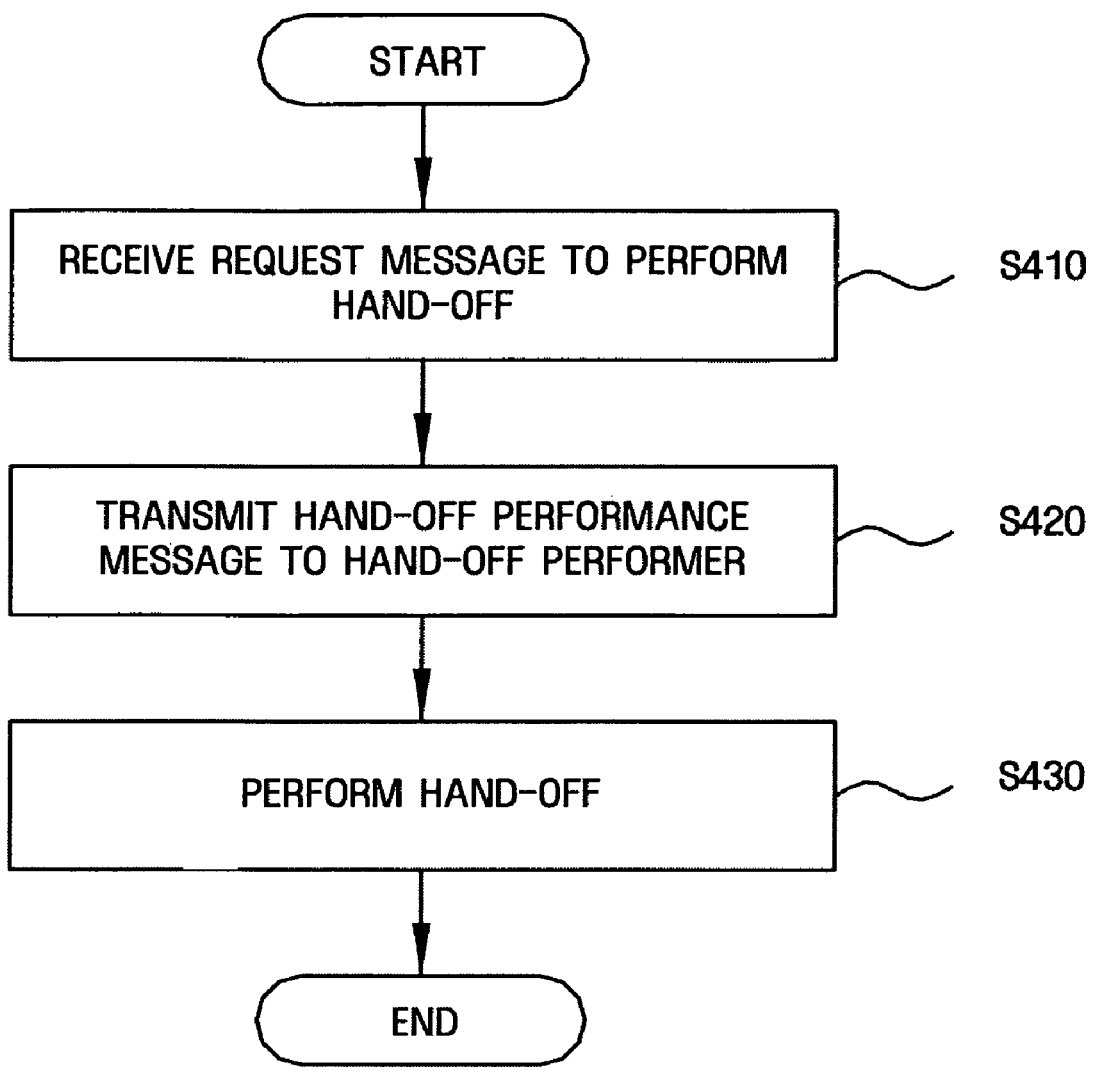

WIRELESS NETWORKING DEVICE AND COMMUNICATION METHOD USING THE SAME

CROSS-REFERENCE TO RELATED APPLICATION

This application claims priority from Korean Patent Application No. 10-2004-0082922 filed on Oct. 16, 2004 in the Korean Intellectual Property Office, the disclosure of which is incorporated herein by reference in its entirety.

BACKGROUND OF THE INVENTION

1. Field of the Invention

The present invention relates to a wireless networking device and a communication method using the same, and, more particularly, to a wireless networking device and a communication method using the same that performs a hand off between wireless networks without difficulty.

2. Description of the Related Art

As mobile communication devices become widely used, the demand for Internet services in wireless environments increases. Also, users want to use the Internet with mobility.

Thus, studies are being actively conducted on wireless LANs, mobile IPs, and Mobile Ad Hoc Networks (MANETs) to provide users with wireless Internet services.

MANET refers to a solution which is linked to IPv6 (Internet Protocol version 6) and which gives internet access to a home network which connects all terminals in a home wirelessly or in a wired manner, and to mobile devices to support wired and wireless data communication.

Ipv6 is an upgraded version of Ipv4 and is compatible with Ipv4. Also, Ipv6 is designed to efficiently operate in low speed networks, as well as in high speed networks such as ATM networks.

As more devices accessed the Internet using Ipv4, the number of addresses allotted to devices became insufficient. Thus, the priority in developing Ipv6 is to increase the number of devices that can access the Internet. The address size of Ipv6 is 128 bit, which is an increase from the 32 bit addresses of Ipv4.

FIG. 1 illustrates a configuration of a conventional wireless network. A gateway 11 of a predetermined wireless network 10 transmits router information to a plurality of mobile devices existing in a corresponding wireless network to automatically set an address and to perform other tasks.

The router information comprises an address and a lifetime of the gateway 11. The respective mobile devices check which mobile network they reside in and automatically set the address.

Meanwhile, as a plurality of mobile devices access the external network through the gateway 11, a bottleneck occurs between the gateway 11 and the mobile devices adjacent to the gateway 11.

Accordingly, two gateways 11 and 12 may be installed in the mobile network 10, as shown in FIG. 2, to reduce the bottleneck and delay time of the packet transmission.

If a plurality of gateways 11 and 12 are used as shown in FIG. 2, a care of address is generated by a function that automatically generates IPv6 addresses, and the gateways 11 and 12 transmit a neighbor solicitation (NS) message to mobile devices adjacent to them to confirm whether other mobile devices in the MANET use the generated care of address. Specifically, the gateways 11 and 12 determine that the care of address is not repeated if there is no response for a predetermined period of time after transmitting the NS message to adjacent mobile devices.

Also, the respective mobile devices receive the router information from the plurality of gateways to access the external network through closer gateways. Accordingly, if the closer gateways are different from the previous gateways, a hand off should be performed.

The MANET comprises at least one gateway mobile device that is adjacent to or multiple hops away from the gateway. The MANET may not detect whether the address of the mobile device that is two or more hops away is repeated through the technique which detects repeated addresses of mobile devices only one hop away from the device itself.

Thus, a method is required to avoid packet transmission delay due to a shortage of the gateways and to detect, more reliably, a repeated address in a MANET having multiple hops.

Korean Patent Unexamined Publication No. 2004-0045188, incorporated herein by reference, discloses a method of managing a routing table using an IPv6 interface ID, which manages a routing table by using an inherent interface ID for respective interfaces, and prevents multiple source address confusion in a routing table. However, the method is provided to settle routing confusion that may occur by designating multiple IPv6 link local addresses to a single interface, but it is inappropriate for detecting a repeated address between mobile devices that are multiple hops away from a gateway while the mobile devices perform the hand-off.

SUMMARY OF THE INVENTION

An aspect of the present invention is to provide a wireless networking device and a communication method using the same which allows hand off to be performed between a plurality of wireless networks and prevents repeating an address without difficulty in a wireless network environment such as a mobile ad Hoc Network (MANET).

Illustrative, non-limiting embodiments of the present invention may overcome the above disadvantages and other disadvantages not described above. The present invention is not necessarily required to overcome any of the disadvantages described above, and the illustrative, non-limiting embodiments of the present invention may not overcome any of the problems described above. The appended claims should be consulted to ascertain the true scope of the invention.

According to an aspect of the present invention, a wireless networking device is provided. The wireless networking device includes an address generator to generate an address to be used in a predetermined wireless network; a router information setter to set router information of the wireless network; and a controller to control operation of the address generator and the router information setter according to the router information and perform hand-off to a wireless network which corresponds to the router information.

According to another aspect of the present invention, a communication method using a wireless networking device is provided. The method includes receiving router information of a predetermined wireless network; generating an address and setting router information according to the received router information; and performing hand-off according to the received router information.

BRIEF DESCRIPTION OF THE DRAWINGS

The above and/or other aspects of the present invention will become more apparent by describing in detail exemplary embodiments thereof with reference to the accompanying drawings. In the drawings, the same reference characters denote analogous elements, in which:

FIG. 13 illustrates a structure of care of address information which is supplied to an information manager while the hand-off is performed in the communication method using the wireless networking device according to an illustrative, non-limiting embodiment of the present invention;

FIG. 14 illustrates a structure of gateway information which is supplied to the information manager while the hand-off is performed in the communication method using the wireless networking device according to an illustrative, non-limiting embodiment of the present invention;

FIG. 15 is a flow chart illustrating a method of performing the hand-off in the communication method using the wireless networking device according to the embodiment of an present invention;

DETAILED DESCRIPTION OF THE EXEMPLARY, NON-LIMITING EMBODIMENTS

Aspects and/or features of the present invention and methods of accomplishing the same may be understood more readily by reference to the following detailed description of the exemplary, non-limiting embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims.

Figure 1:
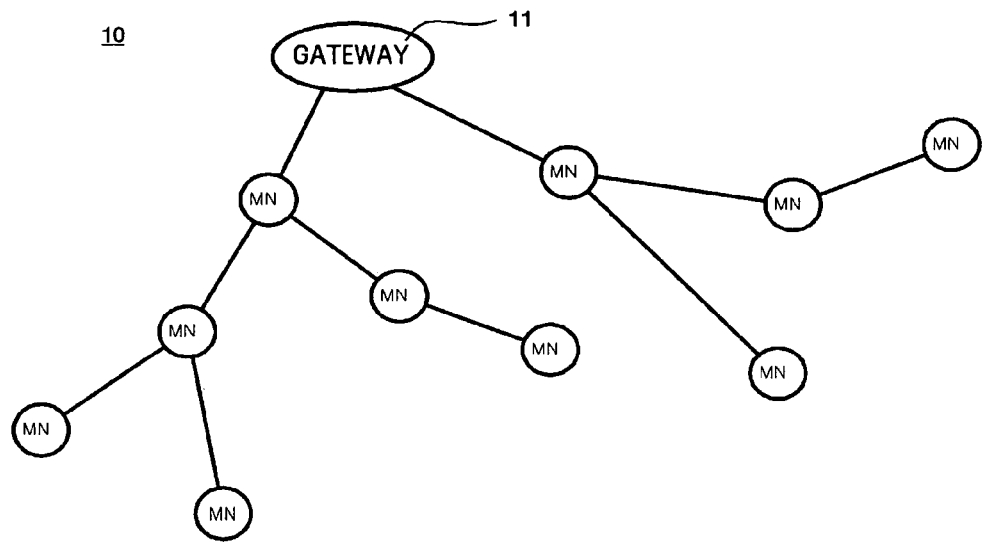
FIG. 1 illustrates a configuration of a conventional wireless network.
Figure 2:
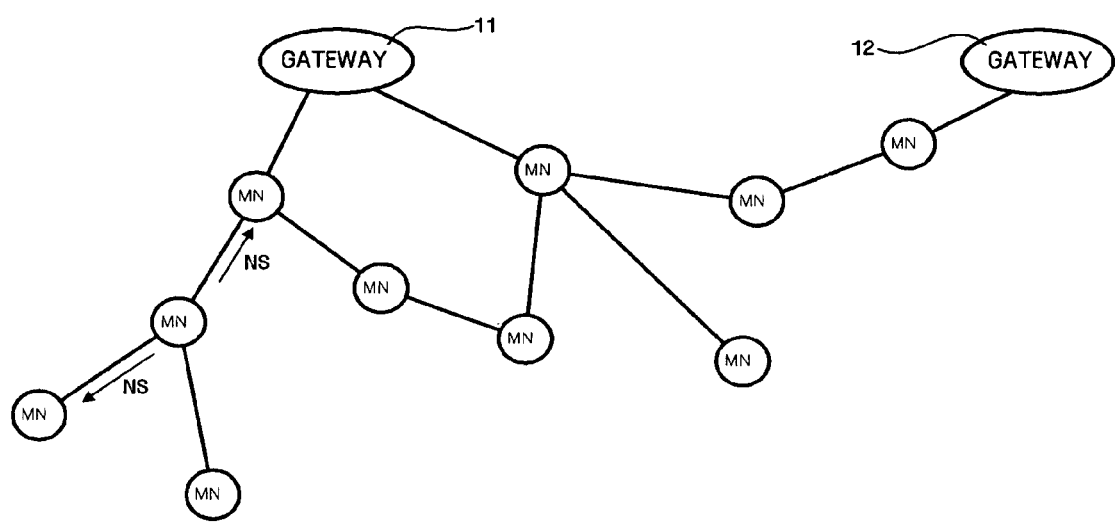
FIG. 2 illustrates a configuration of a wireless network having a plurality of conventional gateways.
Figure 3:
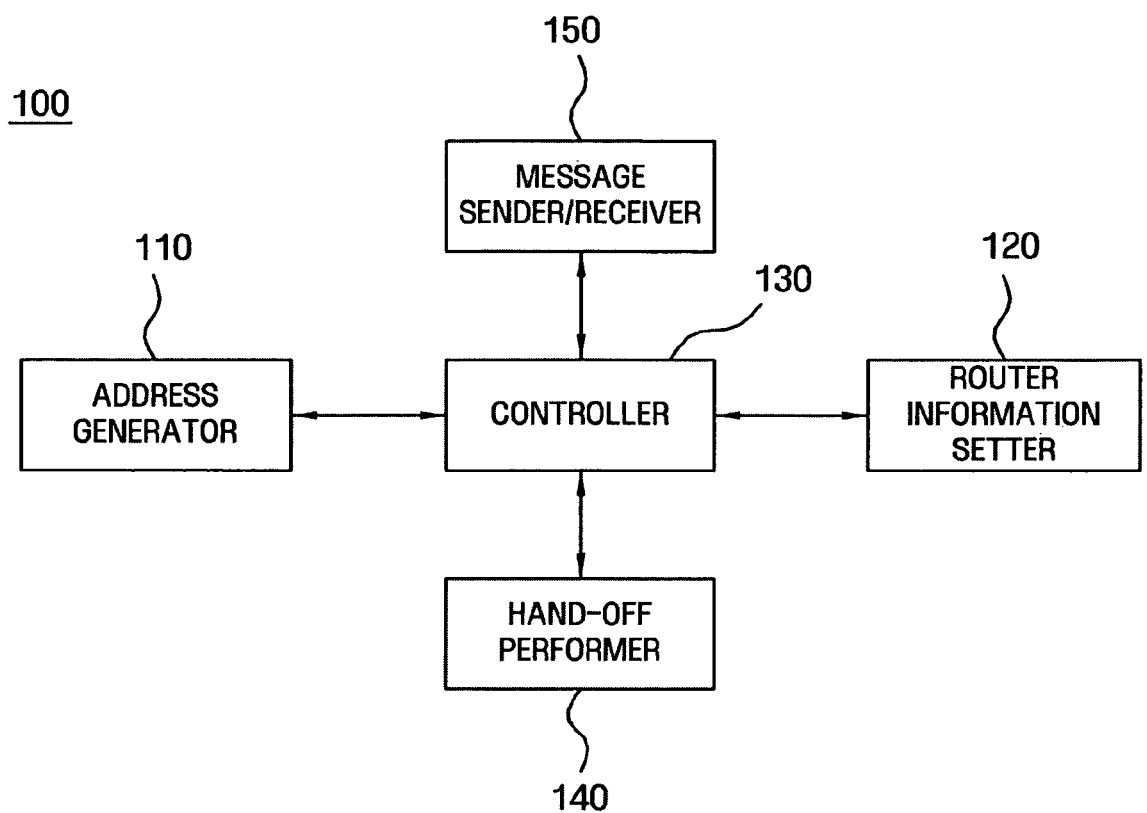
FIG. 3 is a block diagram illustrating a wireless networking device according to an exemplary, non-limiting embodiment of the present invention.

FIG. 3 illustrates a wireless networking device according to an illustrative, non-limiting embodiment of the present invention.

As shown therein, a wireless networking device 100 according to the embodiment of the present invention may comprise an address generator 110 to generate an address according to router information, which is received within a predetermined network, and determine whether the generated address is the same as that of other wireless networking devices in the corresponding network. The wireless networking device 100 may further comprise a router information setter 120 to set the router information with respect to a gateway of a current network according to the received router information, and a controller 130 to determine whether to perform a hand-off according to the received router information and to control operation of the address generator 110 and the router information setter 120 according to the determination.

The wireless networking device 100 may further comprise a hand-off performer 140 to perform the hand-off according to the direction of the controller 130, and a message sender/receiver 150 to check whether the address generated by the address generator 110 is the same as that of other wireless networking devices that are one and more hops away from the gateway while receiving the router information and performing the hand-off.

Figure 4:
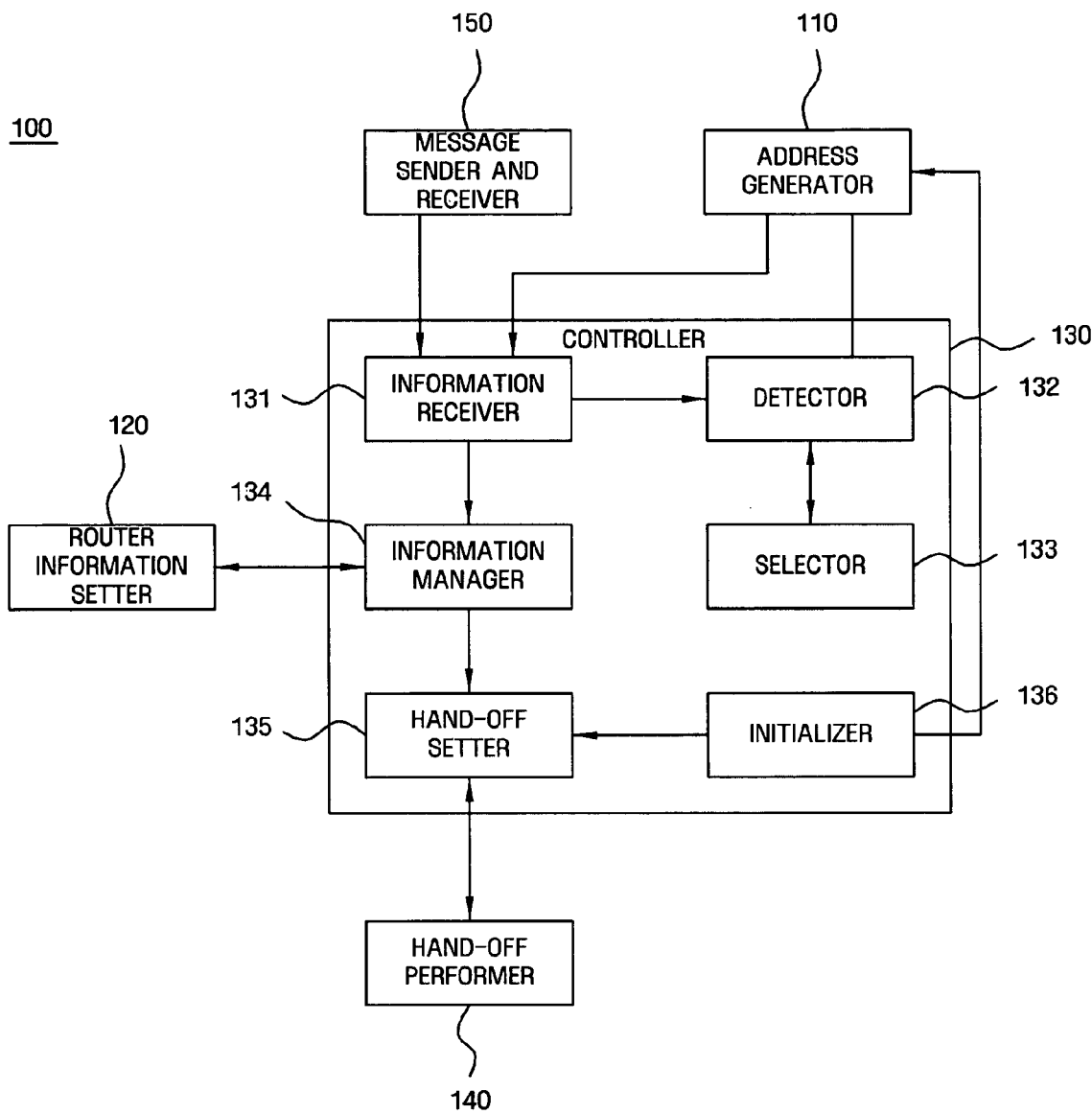
FIG. 4 is a block diagram illustrating a controller of the wireless networking device according to an illustrative, non-limiting embodiment of the present invention.

Referring to FIG. 4, the controller 130 according to the embodiment of the present invention will be described in detail.

As shown therein, the controller 130 comprises an information receiver 131 to receive the router information from a gateway included in the predetermined network through the message sender/receiver 150, a detector 132 to detect whether the router information received from the information receiver 131 is from a new network, a selector 133 to determine whether to perform a hand-off to the new network if it is determined by the detector 132 that the wireless network device 100 has moved to a new network, an information manager 134 to control the information setter 120 according to an address generated from the address generator 110 and to change gateway information if the device moves to the new network, a hand-off setter 135 to control the hand-off performer 140 according to the changed gateway information and to perform the hand-off to the new network, and an initializer 136 to perform a predetermined initialization process if the power of the wireless networking device 100 is turned on.

The information receiver 131 transmits the received router information to the detector 132 only if the information received from the message sender/receiver 150 is the router information. The detector 132 may determine through the received router information whether the information is from the new network. At this time, the received router information may comprise an address, life time and DNS information of the gateway of the corresponding network.

Hereinafter, a "home network" refers to an old network which the wireless networking device 100 resides in, and an "external network" refers to a new network to which the wireless networking device 100 moves to.

That is, the detector 132 determines whether the wireless networking device 100 has moved to the external network depending on whether the router information received through the information receiver 131 is the home network if the router information of the pre-stored network is the home network.

The selector 133 may decide to perform the hand-off to the external network if it is determined by the detector 132 that the wireless network device 100 has moved to the external network. At this time, the selector 133 may select to hand-off to the external network according to conditions of performing a predetermined hand-off, even though the router information is received from the gateway included in the external network.

The conditions of performing the hand-off may comprise the number of hops and traffic between the gateway of the home network and the gateway of the external network. The selector 133 may enable the hand-off to be performed selectively according to conditions, and the conditions may change according to the network environment.

Meanwhile, the detector 132 transmits a command to the address generator 110 to generate a care of address to be used in the external network if the hand-off is performed by the selector 133. In short, the term "a care of address" is a temporary IP address for a mobile device as used in the industry. At this time, the care of address accords with mobile IPv6 standards. If the wireless networking device 100 is moved from the home network to the external network, the wireless network device 100 receives the care of address that represents the current location thereof. Also, the gateway of the home network maintains mapping information between the address used by the wireless networking device in the home network and the care of address. With such mapping information, a packet may be transmitted through the care of address without passing through the gateway of the home network.

The care of address generated by the address generator 110 is supplied to the information receiver 131 in order to be transmitted to the information manager 134. The information manager 134 determines whether the received address is used in the home network to confirm the hand-off. Specifically, the information manager 134 determines that the hand-off is to be performed if the care of address is transmitted. If the care of address has not been transmitted, the information manager 134 may determine that the wireless networking device 100 is located in the home network.

If the care of address is transmitted, the information manager 134 controls the router information setter 120 to transmit a command to renew the gateway information of the external network.

At the same time, the hand-off setter 135 controls the hand-off performer 140 to perform the hand-off.

If the power of the wireless networking device 100 is turned on, the initializer 136 determines whether the address of the home network exists, and may set the address of the home network according to a result of the determination. If the address of the home network does not exist, the initializer 136 may change the state of the wireless networking device 100 into the state of waiting for the router information from the predetermined network.

Hereinafter, a communication method using the wireless networking device 100 will be described.

Figure 5:
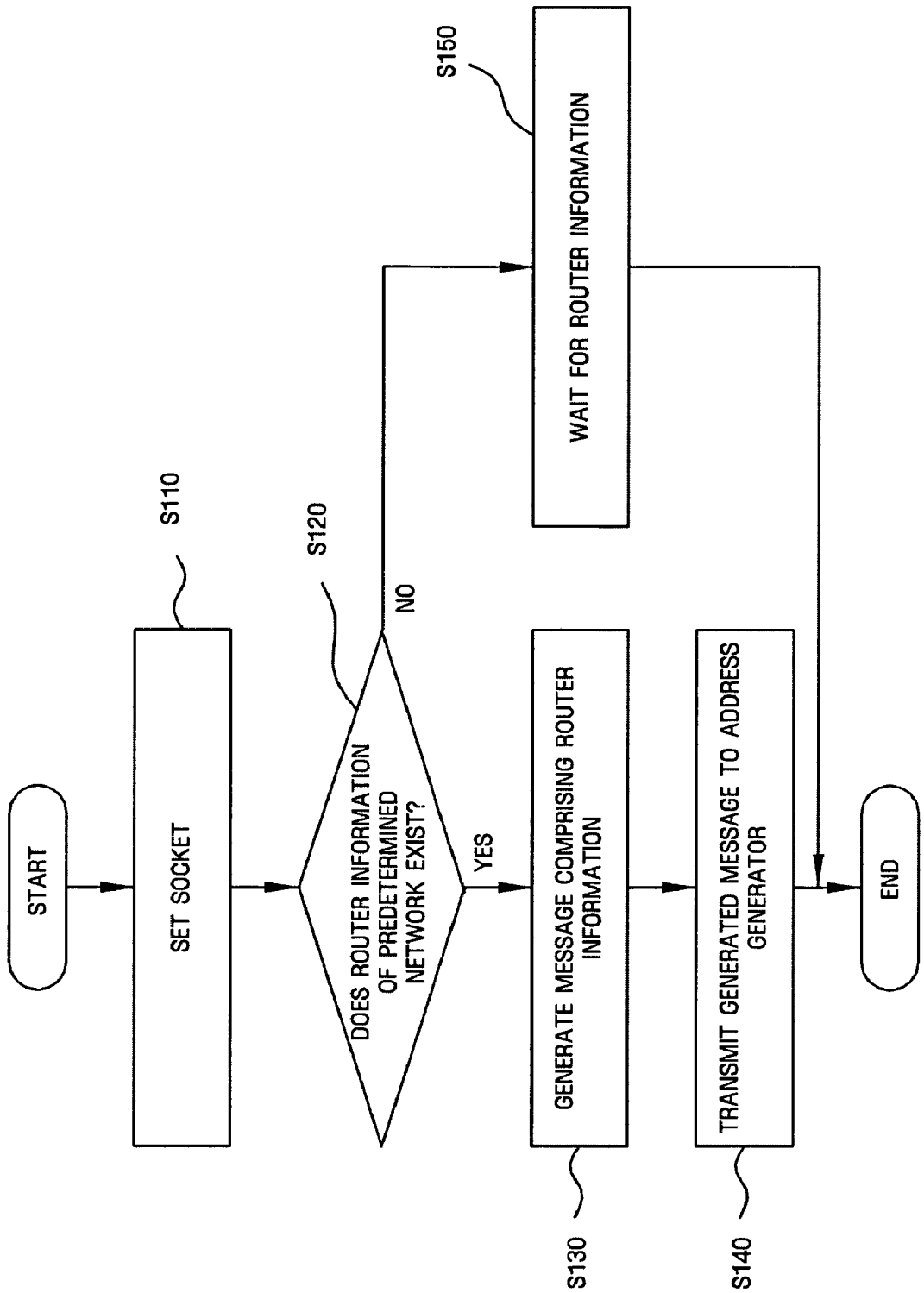
FIG. 5 is a flow chart illustrating a method of initializing a wireless networking device according to the embodiment of the present invention.

FIG. 5 illustrates an initializing method that is performed when the power of the wireless networking device 100 is turned on, according to an illustrative, non-limiting embodiment of the present invention.

As shown therein, if the power of the wireless networking device 100 is turned on, the initializer 136 sets a socket to communicate with other wireless networking devices in operation S110.

Then, the initializer 136 determines whether the router information exists with respect to the predetermined network in operation S120. The router information may specify the home network or the external network. The initializer 136 may initialize the home network or the external network according to the existing router information.

As an example of the present invention, the wireless networking device 100 is located in the home network.

If it is determined that the router information of the home network exists, the initializer 136 generates a message comprising the router information of the home network in operation S130, and transmits the generated message to the address generator 110 in operation S140.

At this time, the address generator 110 generates a predetermined address through the router information included in the transmitted message, and determines whether the address is the same as the address of other wireless networking devices.

If the router information of the predetermined network does not exist, the home network maintains the stand-by mode until it receives the router information from the gateway of the corresponding network in operation S150.

Figure 6:
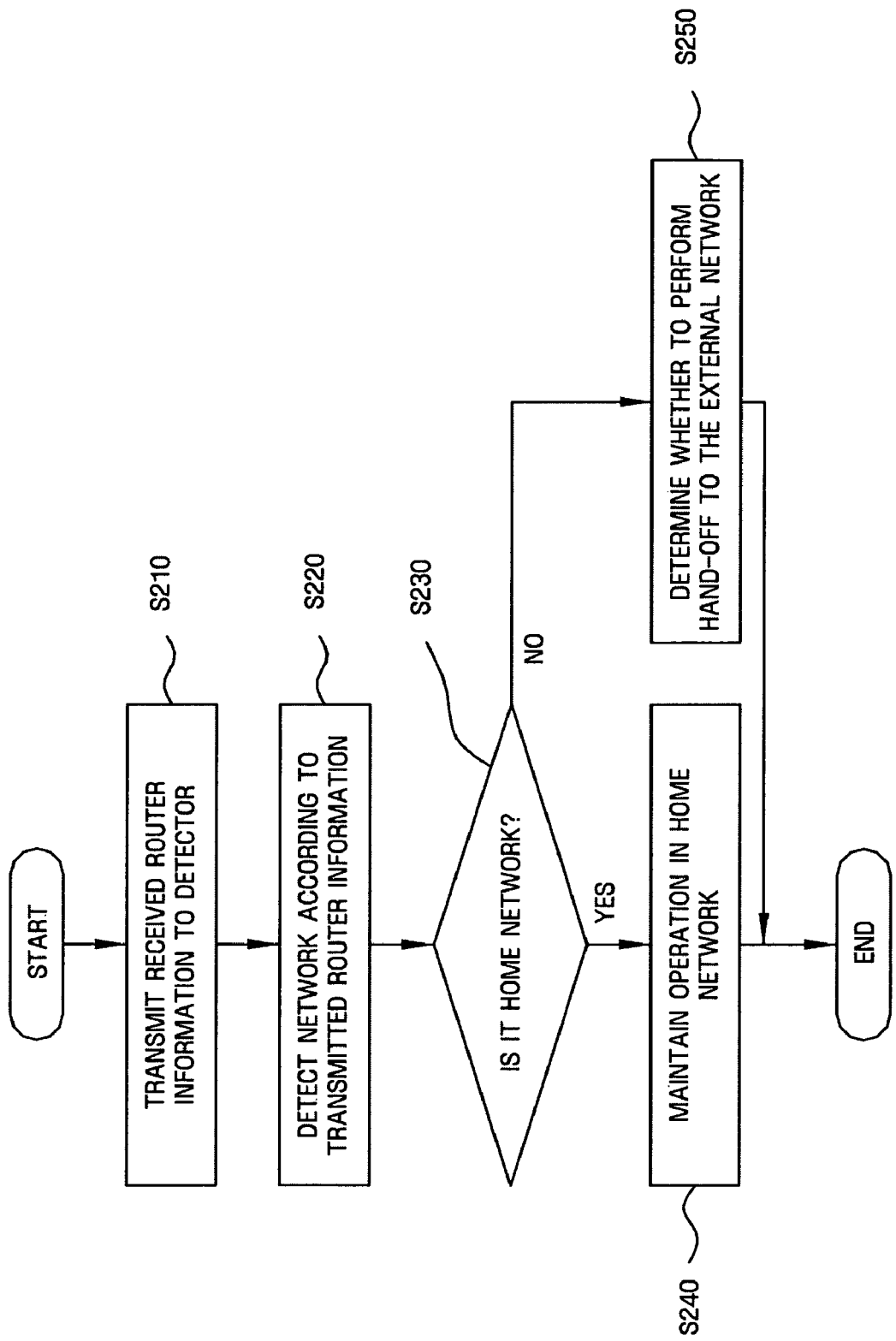
FIG. 6 is a flow chart illustrating a method of determining the hand-off between wireless networks according to the embodiment of the present invention.

FIG. 6 illustrates, according to an exemplary, non-limiting embodiment of the present invention, a method of determining the hand-off to the external network if the wireless networking device 100 is moved from the home network to the external network and now receives new router information.

Figure 7:
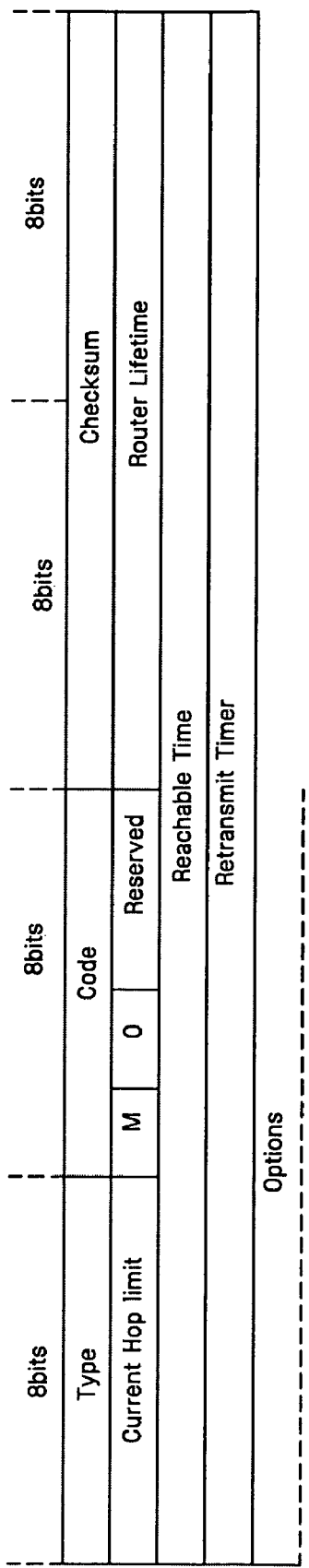
FIG. 7 illustrates structure of router information received by the wireless networking device according to an exemplary, non-limiting embodiment of the present invention.
Figure 8:
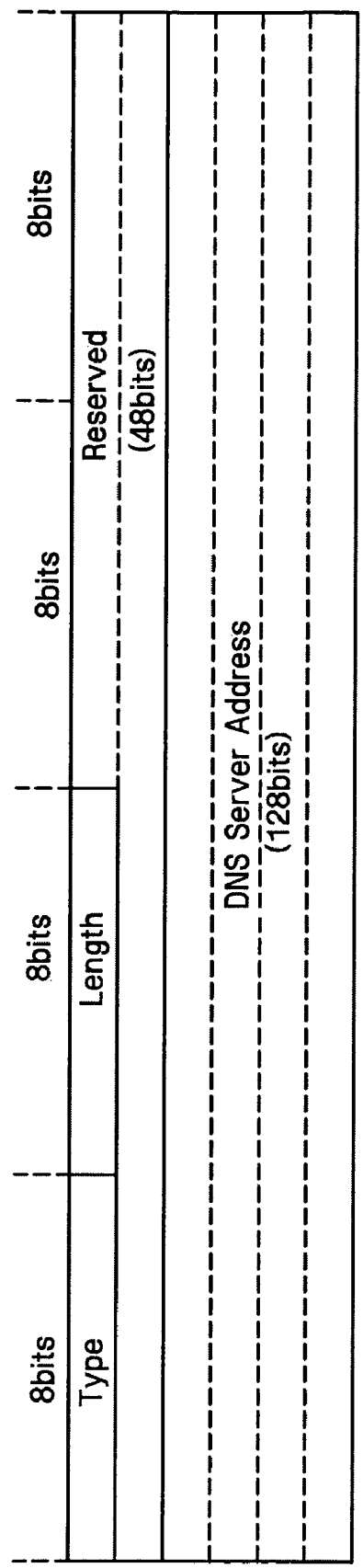
FIG. 8 illustrates structure of DNS information included in the router information received by the wireless networking device according to an illustrative, non-limiting embodiment of the present invention.

As shown therein, if the router information, depicted in FIG. 7, of the predetermined network is received though the information receiver 131 as shown in FIG. 6, the received router information is transmitted to the detector 132 in operation S210. The received router information may comprise DNS information, and the DNS information may comprise a DNS server address, as shown in FIG. 8.

The detector 132 may determine whether the current network is the home network or the external network in operation S220.

If the detector 132 determines that the router information specifies the home network in operation S230, the wireless networking device 100 remains in operation in the existing home network, in operation S240.

If the detector 132 determined that the router information specifies the external network, the wireless networking device 100 determines whether to perform the hand-off to the external network in operation S250.

If the received router information does not exist or the router information is being received as shown in operation S150 in FIG. 5, a message is transmitted to the address generator 110 to request the router information of the corresponding network, and the stand-by mode is maintained to receive the router information according to the transmitted message.

Figure 9:
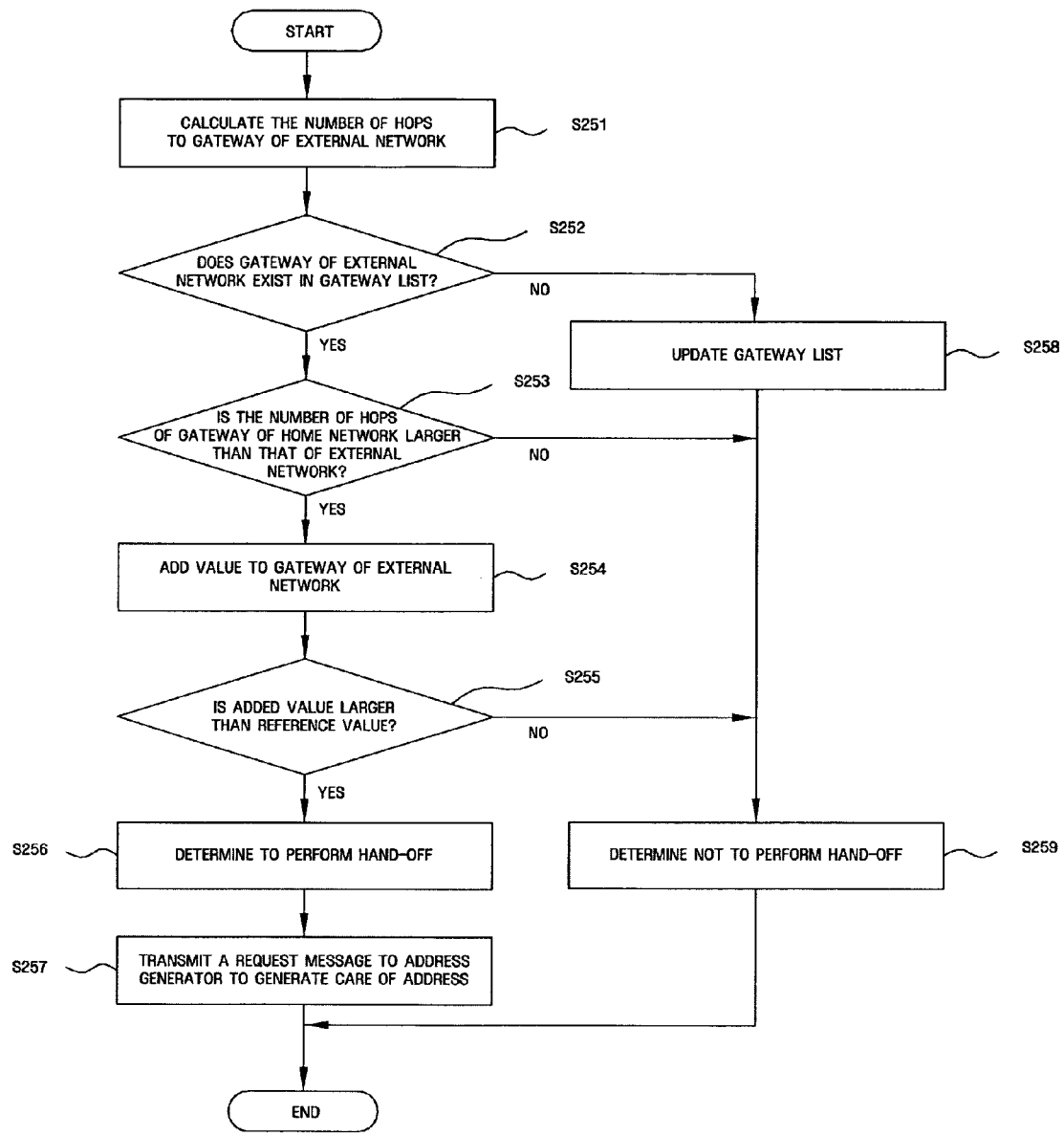
FIG. 9 is a flow chart illustrating a method of determining the hand-off according to the router information received in the communication method using the wireless networking device according to an illustrative, non-limiting embodiment of the present invention.

FIG. 9 illustrates a method of determining the hand-off of operation S250 of FIG. 6.

As shown therein, if it is determined that the router information of the external network has been received, the detector 132 calculates the number of hops to the gateway of the external network, in operation S251.

The selector 133 determines whether the gateway exists, which corresponds to the router information supplied to a pre-stored gateway list in operation S252.

If the selector 133 determines that the gateway corresponding to the received router information exists, the selector 133 compares the number of the hops to the gateway of the home network with that of the external network in operation S253.

If the number of hops to the gateway of the external network is less than that of the home network, a predetermined value is added to the gateway of the external network in operation S254.

If the result exceeds a predetermined reference vale in operation S255, the hand-off to the external network is performed in operation S256.

Figure 10:
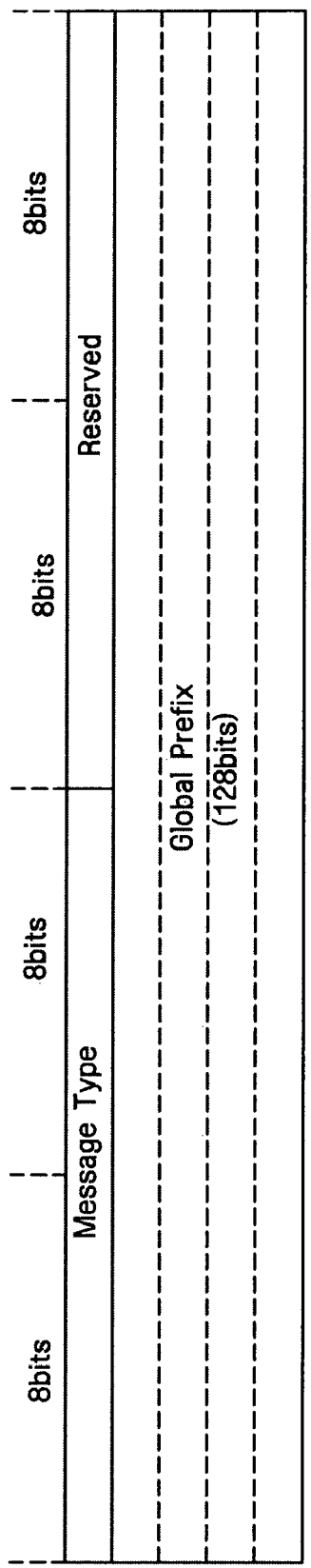
FIG. 10 illustrates the structure of the router information that is transmitted to an address generator while the hand-off is performed in the communication method using the wireless networking device according to the embodiment of the present invention.

If it is determined that the hand-off should be performed, the detector 132 transmits a request message shown in FIG. 10 to generate the care of address to the address generator 110 in operation S257.

Figure 11:
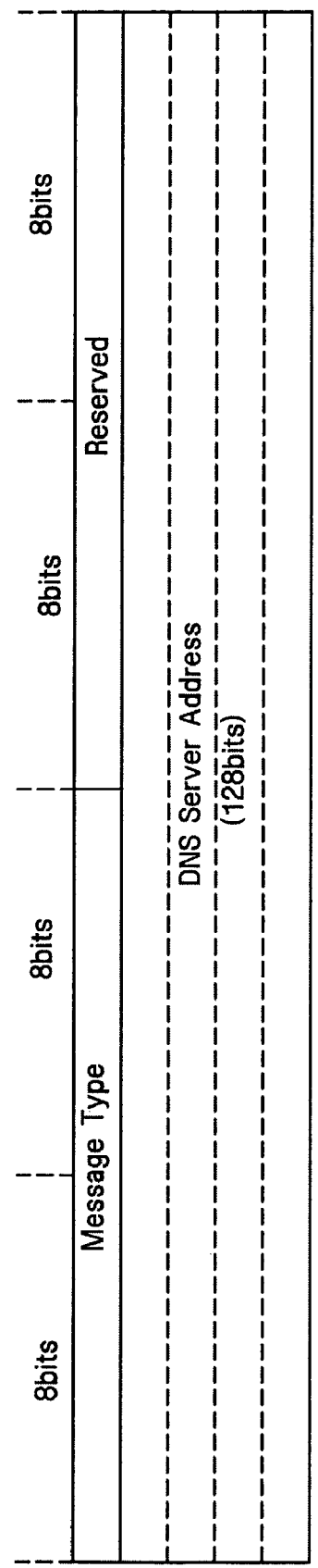
FIG. 11 illustrates the structure of the DNS information included in the router information transmitted to the address generator while the hand-off is performed in the communication method using the wireless networking device according to the embodiment of the present invention.

If the router information received by the address generator 110 comprises DNS information, the DNS information may be included in the request message that instructs generation of the care of address, as shown in FIG. 11.

In the determining method of FIG. 9, if the gateway according to the received router information does not exist in the gateway list, the gateway list is updated in operation S258. If the number of hops to the gateway of the home network is smaller than that of the external network, or the added value of the gateway is smaller than the reference value, the hand-off is not performed, operation S259.

If the care of address is generated by the address generator 110, the information manager 134 controls the router information setter 120 to set a basic gateway as the gateway of the external network.

Figure 12:
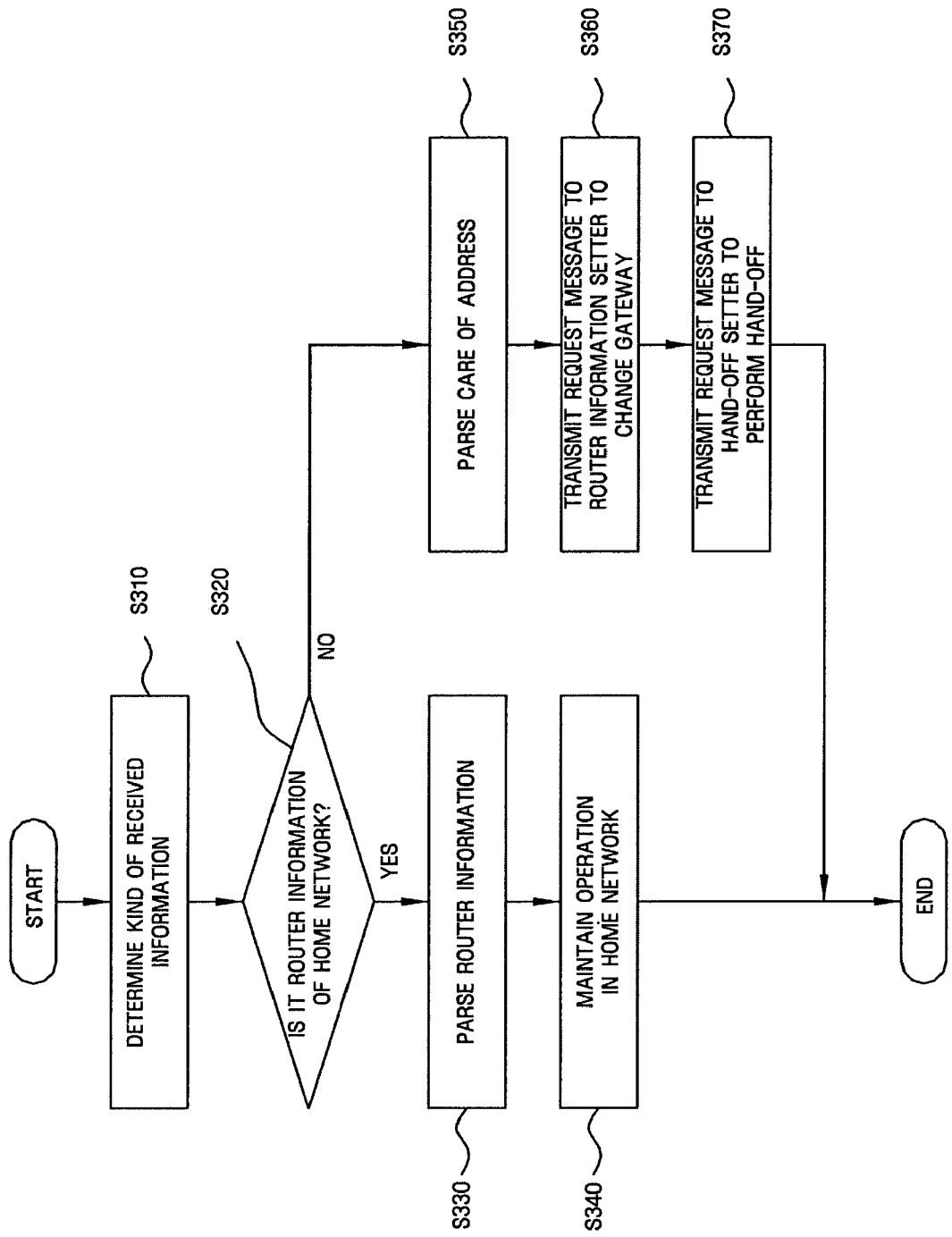
FIG. 12 is a flow chart illustrating a method of determining whether the hand-off has been completed in the wireless network according to an exemplary, non-limiting embodiment of the present invention.

FIG. 12 is a flow chart illustrating a method of setting a basic gateway as the gateway of the external network.

The information manager 134 controls the router information setter 120 to set the basic gateway based on the kind of the information received from the address generator 110 via the information receiver 131.

As shown in FIG. 12, the information manager 134 determines the kind of the information received through the information receiver 131 in operation S310.

The exemplary information received from the address generator 110 through the information receiver 131 is shown in FIGS. 13 and 14. Specifically, FIG. 13 illustrates the structure of care of address information supplied to the information manager 134 and FIG. 14 shows the structure of router information of the home network.

If it is determined that the received information is the router information of the home network in operation S320, the information manager 134 parses the received router information in operation S330.

Then, the parsed router information is transmitted to the hand-off setter 135 to make the hand-off performer 140 maintain the operation in the home network in operation S340.

If the received information is the care of address, the information manager 134 parses the received care of address in operation S350.

At this time, in operation 360, the message is transmitted to the router information setter 120 to change the basic gateway through the gateway address included in the external network according to the parsed care of address. The request message to perform the hand-off is transmitted to the hand-off setter 135 in operation S370.

The method of performing the hand-off according to the request message transmitted in operation S370 in FIG. 12 is shown in FIG. 15.

As shown in FIG. 15, the hand-off setter 135 receives the message requesting the hand-off from the information manager 134 at operation S410.

Figure 16:
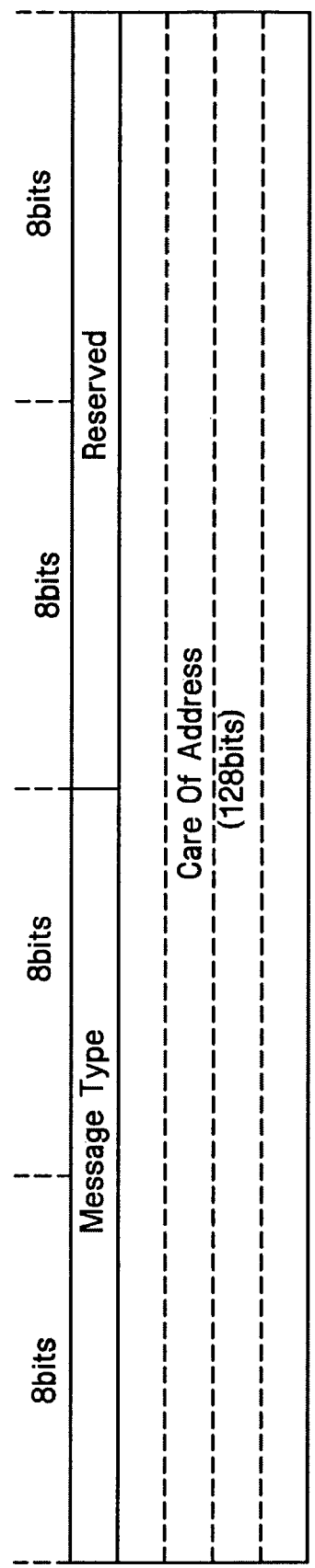
FIG. 16 illustrates a structure of the care of address information transmitted to a hand-off performer in the communication method using the wireless networking device according to an illustrative, non-limiting embodiment of the present invention.

The hand-off setter 135 transmits the hand-off performance message including the care of address generated by the address generator 110 (as shown in FIG. 16) according to the message requesting the hand-off in operation S420.

The hand-off performer 140 performs the hand-off to the external network corresponding to the received router information according to the transmitted hand-off performance message, in operation S430.

Figure 17:
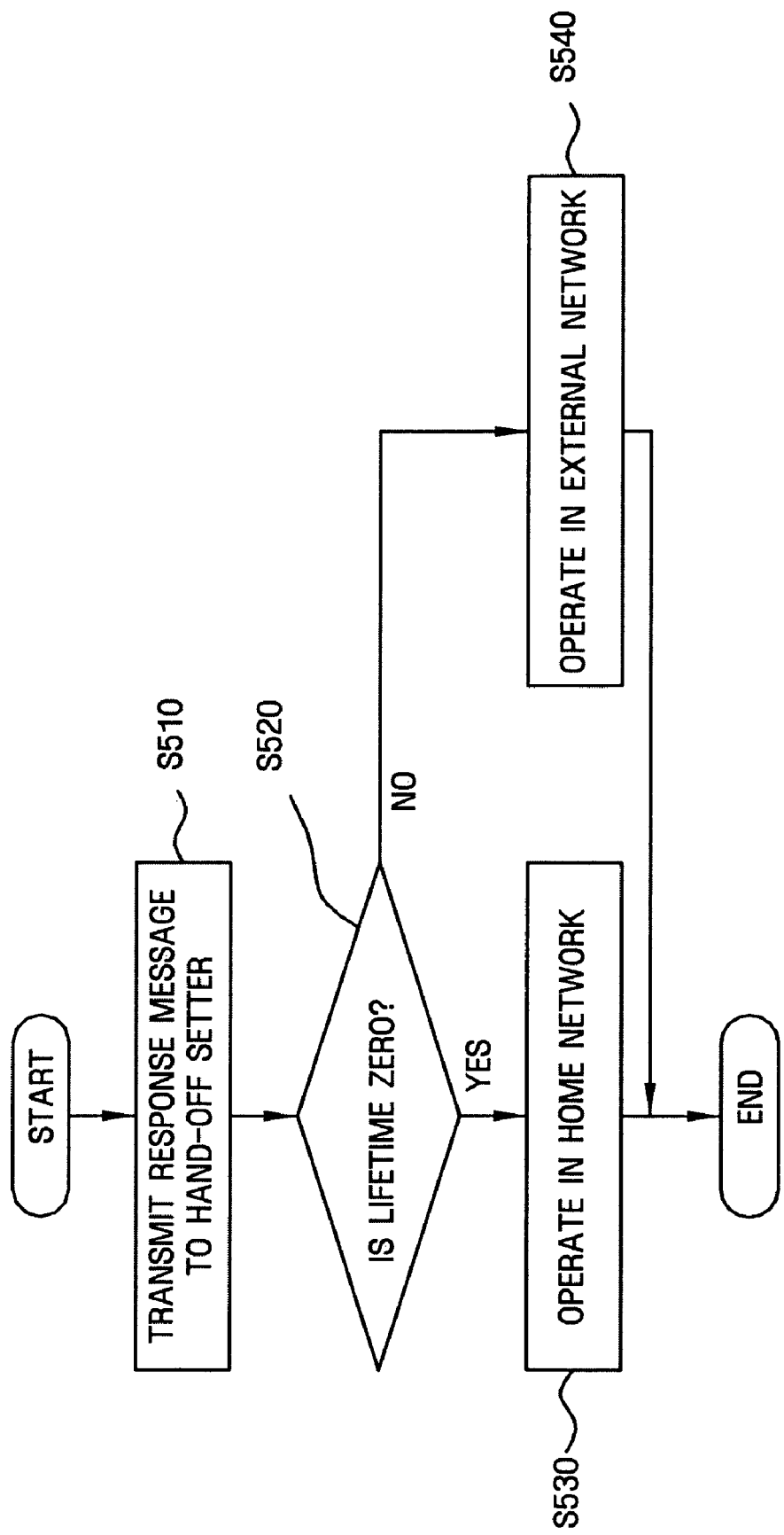
FIG. 17 is a flow chart illustrating a method of determining a wireless network which operates if the hand-off of the wireless networking device has been completed according to an illustrative, non-limiting embodiment of the present invention.
Figure 18:
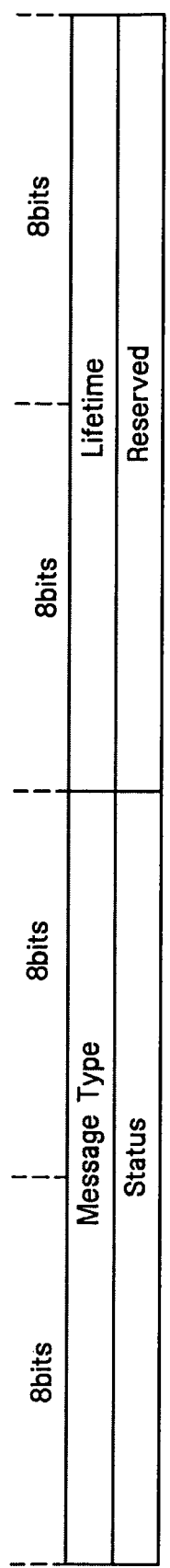
FIG. 18 illustrates a structure of a response information which is transmitted to a hand-off setter from the hand-off performer in the communication method using the wireless networking device according to an illustrative, non-limiting embodiment of the present invention.

If the hand-off to the external network is completed, the hand-off performer 140 transmits a response message (as depicted in FIG. 18) to the hand-off setter 135 in response to the hand-off performance message in operation S510, as shown in FIG. 17.

The hand-off setter 134 may determine whether to perform the hand-off by checking the lifetime included in the received response message.

That is, if the lifetime included in the response message is zero in operation S520, the wireless networking device 100 is considered moved to the home network and the hand-off is not performed, thereby repeating the address of the home network in operation S530.

If the lifetime is a positive number, the wireless networking device 100 is located in the external network and the hand-off is completed in the external network in operation S540.

Figure 19:
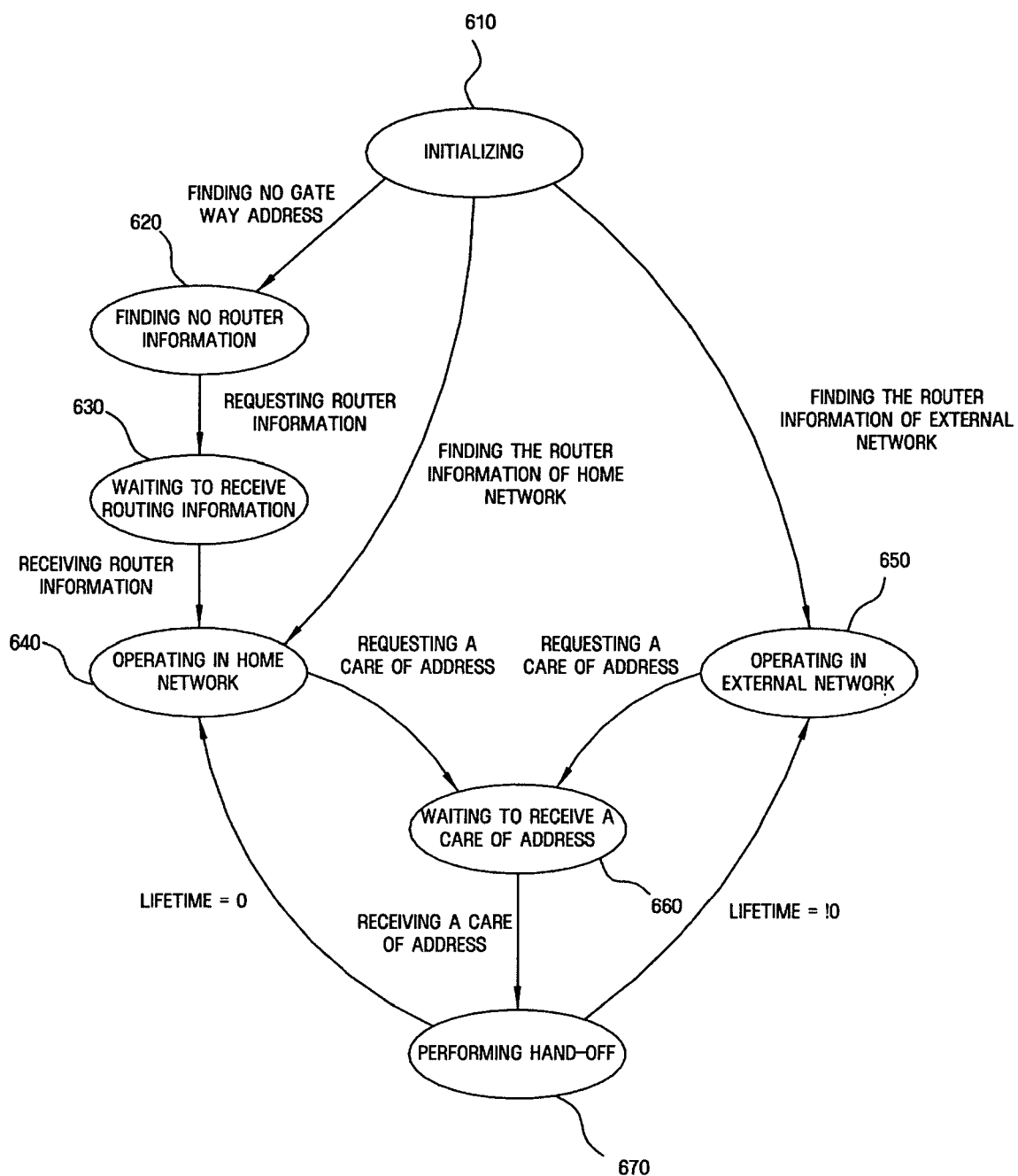
FIG. 19 is a flow chart illustrating communication of the wireless network device according to an exemplary, non-limiting embodiment of the present invention.

FIG. 19 illustrates a communication method of the wireless networking device 100.

As shown in FIG. 19, if the power of the wireless networking device 100 is turned on, the wireless networking device 100 is initialized in operation 610. If the wireless networking device does not have the router information of the predetermined network in operation S620, the wireless networking device 100 receives the router information from the gateway of the predetermined wireless network, and it goes into a stand-by mode to receive the address of the corresponding gateway in operation S630. If it has received the address of the gateway of the corresponding network, the wireless networking device 100 operates in the home network in operation S640.

If the router information of the home network exists at the initialization state (operation S610), the wireless networking device 100 operates directly in the home network in operation S640. If the router information of the external network exists at the initialization state (operation S610), the wireless networking device 100 operates directly in the external network in operation S650.

At this time, if the hand-off is performed in the state of operating in the home network or external network (operations S640 and S650), the wireless networking device 100 requests the address generator 110 to generate the care of address, and goes into the stand-by mode to receive the requested care of address in operation S660.

If the wireless networking device has received the care of address, the wireless networking device 100 performs the hand-off in operation S670. The hand-off is performed from the home network to the external network in operation S650, and from the external network to the home network in operation S640.

For example, if the hand-off is performed from the existing home network to the external network, the lifetime included in the response message of the hand-off performer 120 is a positive number. Conversely, if the hand-off is performed from the external network to the home network, the lifetime included in the response message is zero.

According to the exemplary embodiment of the present invention, it may be possible to determine whether the address of the wireless networking device, which performs the hand-off between a plurality of wireless networks, is repeated in multiple home networks.

In addition, according to the exemplary embodiment of present invention, it may be possible to know the proper time of the hand-off between the plurality of wireless networks, and to minimize the transmission delay.

It will be understood that the methods and structures embodying the invention are shown by way of illustration only and not as a limitation of the invention. It will be understood by those of ordinary skill in the art that various changes in form and details may be made to the present invention without departing from the spirit and scope of the invention as defined by the following claims. Therefore, the scope of the invention is given by the appended claims, rather than the preceding description, and all variations and equivalents which fall within the range of the claims are intended to be embraced therein.

What is claimed is:

1. A wireless networking device comprising:
    an address generator generating an address to be used in a predetermined wireless network;
    a router information setter setting router information of the wireless network based on the router information received from a gateway of a corresponding network; and
    a controller controlling operation of the address generator and the router information setter according to the router information and performing a hand-off to the gateway of the corresponding wireless network which corresponding to the router information,
    wherein the controller determines whether the received router information specifies the gateway of a home network comprising a plurality of nodes or a gateway of an external network that comprises a plurality of nodes, and determines initially to perform the hand-off to the gateway of the external network if the received router information specifies the gateway of the external network,
    wherein if a number of hops to the gateway of the external network is less than a number of hops to the gateway of the current wireless network, the controller calculates a result by adding a predetermined value to the gateway of the external network, and
    wherein if the calculated result exceeds a predetermined reference value, the controller determines to perform the hand-off to the gateway of the external network.

2. The wireless networking device of claim 1, further comprising a hand-off performer to perform the hand-off to the wireless network corresponding to the router information in accordance with instructions from the controller.

3. The wireless networking device of claim 2, wherein the controller comprises: an information receiver receiving the router information, a detector detecting the wireless network corresponding to the received router information, a selector selecting whether or not to perform the hand-off to the wireless network corresponding to the received router information according to the detection, an information manager setting the router information based on the received router information from the information receiver while performing the hand-off, and a hand-off setter performing the hand-off through the hand-off performer.

4. The wireless networking device of claim 3, wherein the detector compares the received router information with pre-stored router information to determine whether the received router information is of a same network as the pre-stored router information.

5. The wireless networking device of claim 3, wherein the information receiver transmits the received router information to the detector only after receiving the router information.

6. The wireless network device of claim 1, wherein the address generator determines whether the generated address is the same as that of other wireless networking devices in the corresponding network.

7. The wireless network device of claim 1, wherein the router information comprises a number of hops and traffic to a gateway of the external network.

8. The wireless network device of claim 1, wherein the address generator and the controller are in the single wireless device that communicates with the gateway of the corresponding network and a gateway of a home network.

9. A communication method using a wireless networking device, comprising:
    determining whether router information specifies a gateway of a home network comprising a plurality of nodes or a gateway of an external network comprising a plurality of nodes, and determining initially to perform the hand-off to the gateway of the external network if the router information specifies the gateway of the external network;
    if a number of hops to the gateway of the external network is less than a number of hops to a gateway of a previous wireless network, calculating a result by adding a predetermined value to the gateway of the external network;
    if the calculated result exceeds a predetermined reference value, determining to perform a hand-off to the gateway of the external network;
    receiving router information of a predetermined wireless network from the gateway of the corresponding network;
    generating an address and setting router information according to the received router information; and
    performing the hand-off according to the received router information.

10. The communication method of claim 9, wherein the performing of the hand-off comprises renewing the router information as router information of the current wireless network if the hand-off is performed.

11. The communication method of claim 9, wherein said receiving, generating, and performing is executed by the single wireless networking device that communicates with the gateway of the external network.

* * * * *